United States Patent [19]

Haines et al.

[11] E Re. 28,921

[45] Reissued Aug. 3, 1976

[54] VISUAL EXAMINATION APPARATUS

[75] Inventors: Richard F. Haines, Los Altos; James W. Fitzgerald, Atascadero; Salvadore A. Rositano, San Jose, all of Calif.

[73] Assignee: The United States of America as represented by the administrator of the National Aeronautics and Space Administration, Washington, D.C.

[22] Filed: Mar. 19, 1974

[21] Appl. No.: 452,768

Related U.S. Patent Documents

Reissue of:

[64] Patent No.: 3,737,214
Issued: June 5, 1973
Appl. No.: 159,857
Filed: July 6, 1971

[52] U.S. Cl. ..... 351/23; 351/30; 351/36

[51] Int. Cl.[2] ..... A61B 3/02; A61B 3/06; A61B 5/00

[58] Field of Search ..... 351/23, 24, 30, 36, 351/39; 128/2.1 R, 2.1 B

[56] References Cited

UNITED STATES PATENTS

| | | | |
|---|---|---|---|
| 2,564,794 | 8/1951 | Shekels | 351/23 X |
| 3,172,404 | 3/1965 | Copenhaver et al. | 351/24 X |
| 3,317,268 | 5/1967 | Oswald | 351/30 |
| 3,421,498 | 1/1969 | Gans | 351/24 X |
| 3,476,465 | 11/1969 | Jackson et al. | 351/23 |
| 3,664,732 | 5/1972 | Lynn | 351/23 X |
| 3,684,355 | 8/1972 | Molner | 351/30 X |
| 3,705,003 | 12/1972 | Lynn et al. | 351/23 X |

*Primary Examiner*—Paul A. Sacher
*Attorney, Agent, or Firm*—Darrell G. Brekke; Armand G. Morin, Sr.; John R. Manning

[57] ABSTRACT

An automated visual examination apparatus for measuring visual sensitivity and mapping blind spot location including a projection system for displaying to a patient a series of visual stimuli, a response switch enabling him to indicate his reaction to the stimuli, and a recording system responsive to both the visual stimuli per se and the patient's responses, the recording system thereby providing a correlated permanent record of both stimuli and response from which a substantive and readily apparent visual evaluation can be made.

16 Claims, 9 Drawing Figures

INVENTORS
RICHARD F. HAINES
JAMES W. FITZGERALD
BY SALVADORE A. ROSITANO

Irmond S. Morin Jr.
ATTORNEY

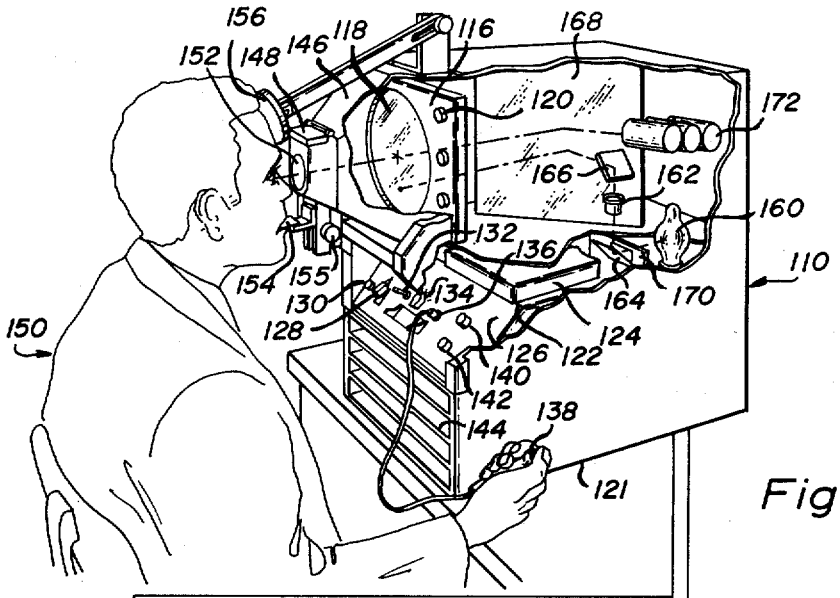
Fig_4
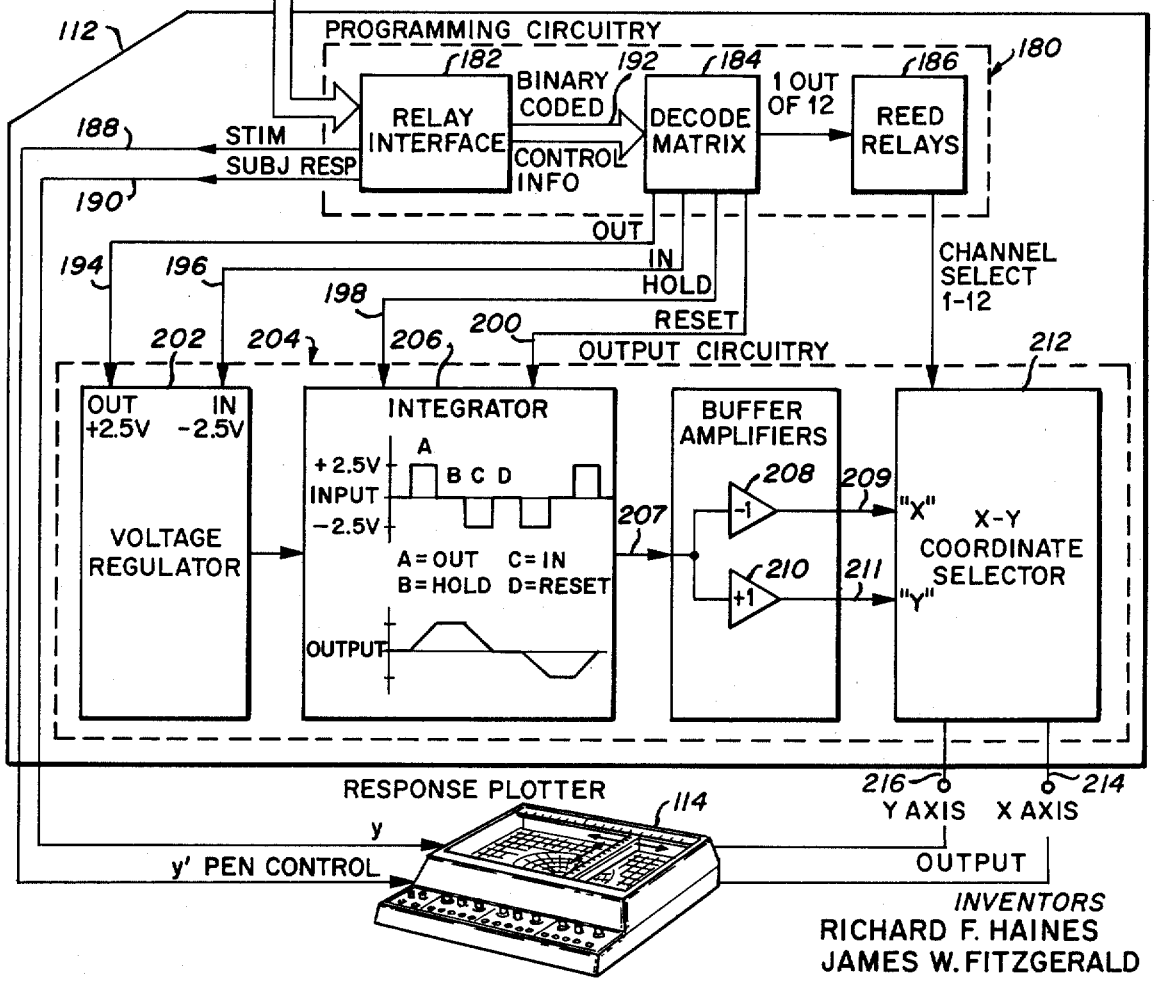
INVENTORS
RICHARD F. HAINES
JAMES W. FITZGERALD
SALVADORE A. ROSITANO
BY
Gerard S. Morris Sr.
ATTORNEY

VISUAL SENSITIVITY - NORMAL RIGHT EYE

BLIND SPOT MAPPING - NORMAL RIGHT EYE

INVENTORS
RICHARD F. HAINES
JAMES W. FITZGERALD
BY SALVADORE A. ROSITANO
Armand G. Morin Sr.
ATTORNEY

VISUAL SENSITIVITY-GLAUCOMATOS RIGHT EYE

BLIND SPOT MAPPING-
GLAUCOMATOS RIGHT EYE

INVENTORS
RICHARD F. HAINES
JAMES W. FITZGERALD
BY SALVADORE A. ROSITANO

Armand S. Morin Sr.
ATTORNEY

VISUAL EXAMINATION APPARATUS

Matter enclosed in heavy brackets [ ] appears in the original patent but forms no part of this reissue specification; matter printed in italics indicates the additions made by reissue.

The invention described herein was made by employees of the United States Government and may be manufactured and used by or for the Government for governmental purposes without the payment of any royalties thereon or therefor.

BACKGROUND OF THE INVENTION

1. Field of the Invention

The present invention relates generally to visual examination apparatus and, more particularly, to an automated visual sensitivity tester for examining the eyes of a human being to determine visual field sensitivity and blind spot size, shape, and position.

2. Description of the Prior Art

Because of the rather substantial dependence of an astronaut on his visual perception and the high degree of likelihood that such perception might change without notice during long term space flight, it is important that vision testing means be provided for enabling him to periodically test and evaluate his visual capabilities.

A test of visual sensitivity during long durations of space flight is important because of the possibility of the occurrence of changes in the transparency of the eye's optic media due to the impingement of various ionizing radiations, foreign matter, or cataract development; changes in the neural, biochemical and/or photochemical processes which underlie visual sensitivity; and changes in the visual perception due to a wide range of retinal and central nervous system dysfunctions which effect sensitivity. In addition, mapping the size, shape, and location of the blind spot is of value not only in determining the state of retinal (thus visual) function near the perimeter of the blind spot, but in providing an indication of changes in intraocular pressure. It is well-known that an intraocular pressure change may indicate such things as the presence of ocular inflammation, changes in blood pressure, elasticity of retinal vessels, body temperature, alkalinity, and osmotic pressure of the cardiovascular system, closure or clogging of the anterior ocular chamber, or variation of the volume of any of the intraocular areas.

Presently, no fully automated visual field testing or blind spot mapping apparatus is commercially available. Although there are available a number of hand-operated visual "perimeters," such as the Goldmann Perimeter and the Feree-Rand B & L Semi-Automatic Recording Perimeter, these devices require that an operator slowly manually move the visual stimulus over the patient's visual field. Furthermore, these devices are difficult to use; require a moderate-to-high degree of operator training in the use of the tester; are relatively expensive; and produce relatively poor correspondence between the test spot's location and its final recorded position in the patient's visual field.

Among the performance criteria for such a vision tester are: adequate sensitivity to changes in visual performance that accompany the various stresses encountered in space flight; sufficient comprehensiveness to detect the possibility of changes in visual functions other than those expected; and adequate diagnostic value—the tester should not only detect a dysfunction, but should provide an indication of the extent of its development.

SUMMARY OF THE PRESENT INVENTION

It is therefore an object of the present invention to provide a convenient and practical means for automatically measuring the visual sensitivity of the patient's eyes, and for accurately delineating the size and shape of the blind spots of the patient's eyes.

In accordance with the present invention, an automated visual examination apparatus is provided which includes a movie projector for presenting dynamic visual stimuli, an infinity collimating lens, a head positioning support, a response button, an electronic control unit, and a two-pen XYY′ response plotter. In the preferred embodiment, a 10-arc-minute diameter dim white spot of light is made to travel across a viewing screen along each of 12 meridians which are separated by 30° arcs in the patient's frontal plane and to randomly disappear and reappear during its traverse. The patient is instructed to press the response button each time the spot disappears, and to release the button when the spot reappears so that his responses can be recorded by one of the two pens of the plotter. The second pen records the on-off status and movements of the visual stimulus. Various dysfunctions can then be assessed by comparing the plotted stimulus and response traces.

The present invention is sensitive to the presence of such dysfunctions as scotomata, glaucoma, and changes in retinal sensitivity which are of such magnitude as to make the dynamic visual stimuli invisible, and can be used to perform other visual examinations by the preparation of other stimulus films, such as glare recovery (using a strobe flash tube addition), motion perception thresholds, visual tracking ability (using an eye tracking monitor addition), visual acuity (using an appropriate stimulus pattern on the film), critical fusion frequency measurements, and color perceptibility.

Among the advantages of the present invention are that all experimental randomizations, light level controls, and other necessary and critical visual characteristics of the stimulus are automatically controlled; use of the device does not require or involve any verbal patient responses; all electronic components are responsive to the stimulus display and patient response button; use of specially prepared test films makes it possible to randomize the presentation order of the visual stimuli; and the device makes it possible to easily and accurately locate and stabilize the patient's head and eyes during the testing period.

In addition to the space travel applications, an automated visual sensitivity tester having the characteristics described above would also have valuable clinical application in ophthalmological and optometric practice due to its ease of operation, high reliability, and completely automated nature.

IN THE DRAWINGS

Figure 3:
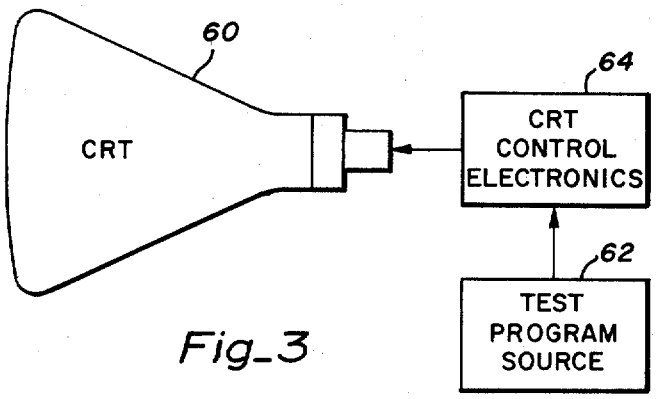

FIG. 3 schematically illustrates an alternative embodiment of the present invention.

FIG. 4 illustrates an automated visual sensitivity testing system in accordance with the present invention.

Figure 4A:
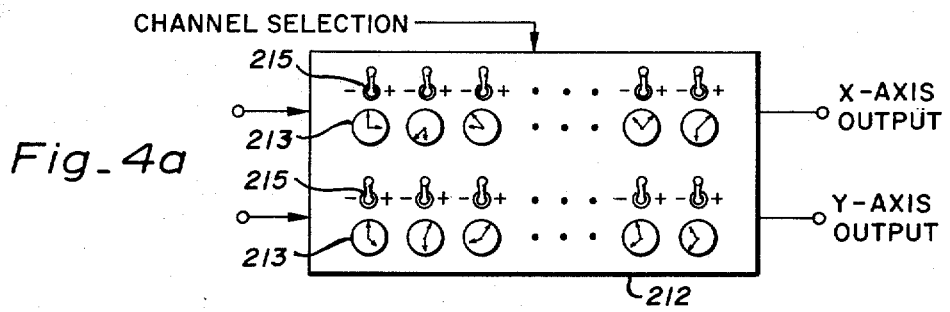

FIG. 4a further illustrates the X-Y coordinate selector shown in FIG. 4.

Figure 5:
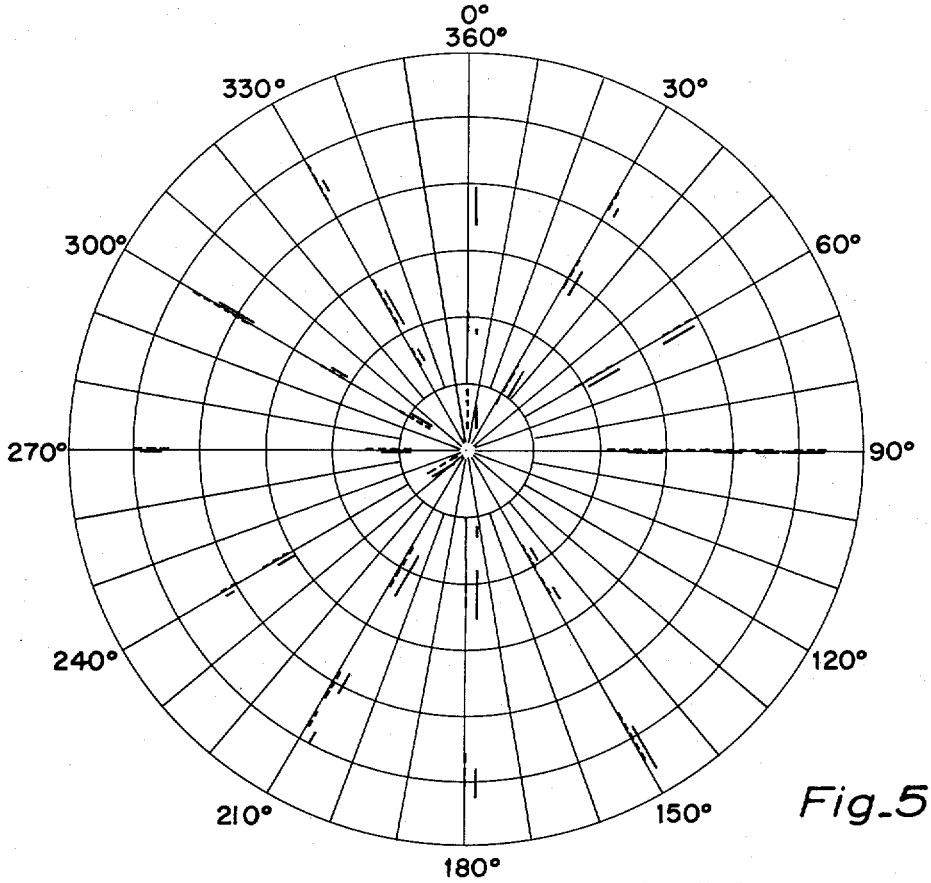

FIG. 5 illustrates the results of a visual sensitivity test for a normal eye using the apparatus of the present invention.

Figure 6:
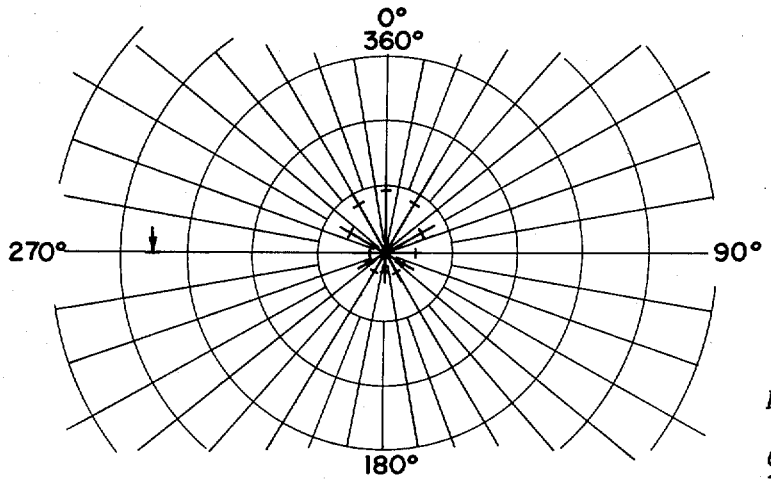

FIG. 6 illustrates the results of a blind spot mapping of a normal eye using apparatus in accordance with the present invention.

Figure 7:
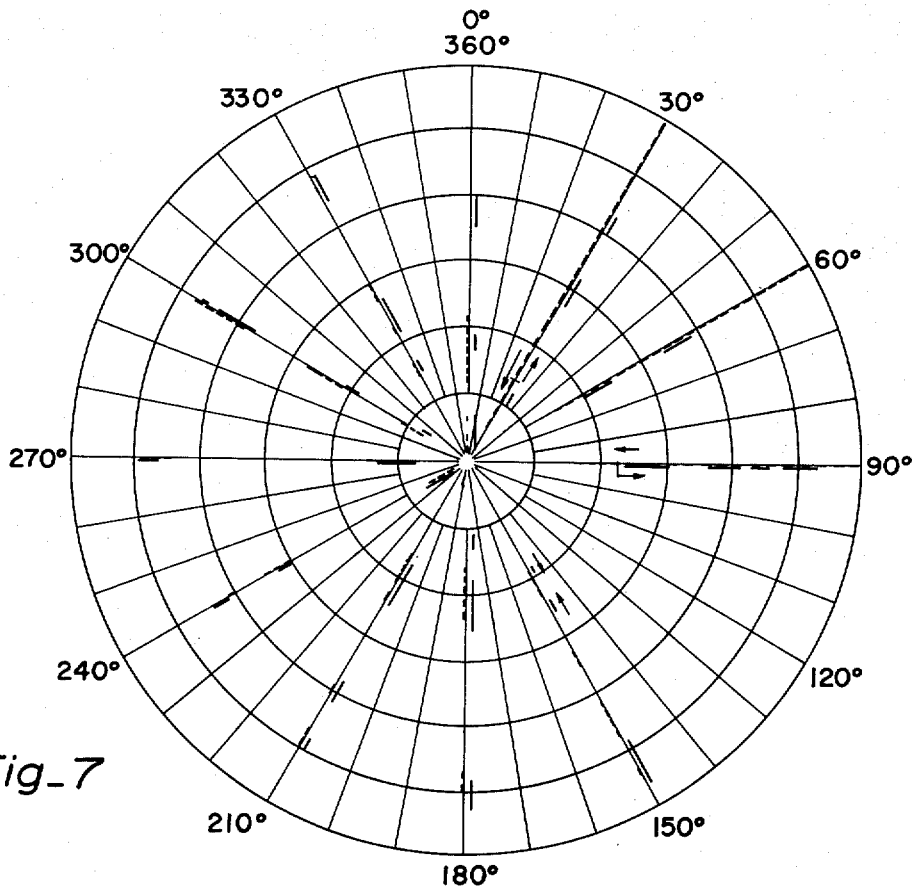

FIG. 7 illustrates the results of a visual sensitivity test for a glaucomatous eye using the apparatus of the present invention.

Figure 8:
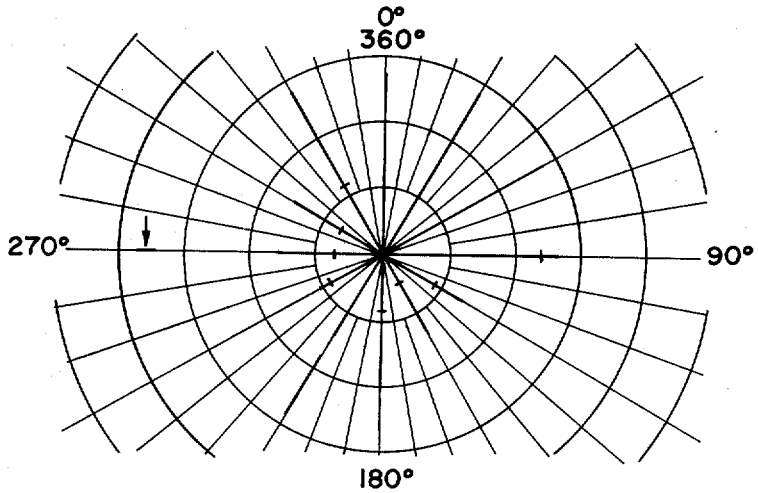

FIG. 8 illustrates the results of a blind spot mapping of a glaucomatous eye using apparatus of the present invention.

DETAILED DESCRIPTION OF THE PREFERRED EMBODIMENT

Figure 1:
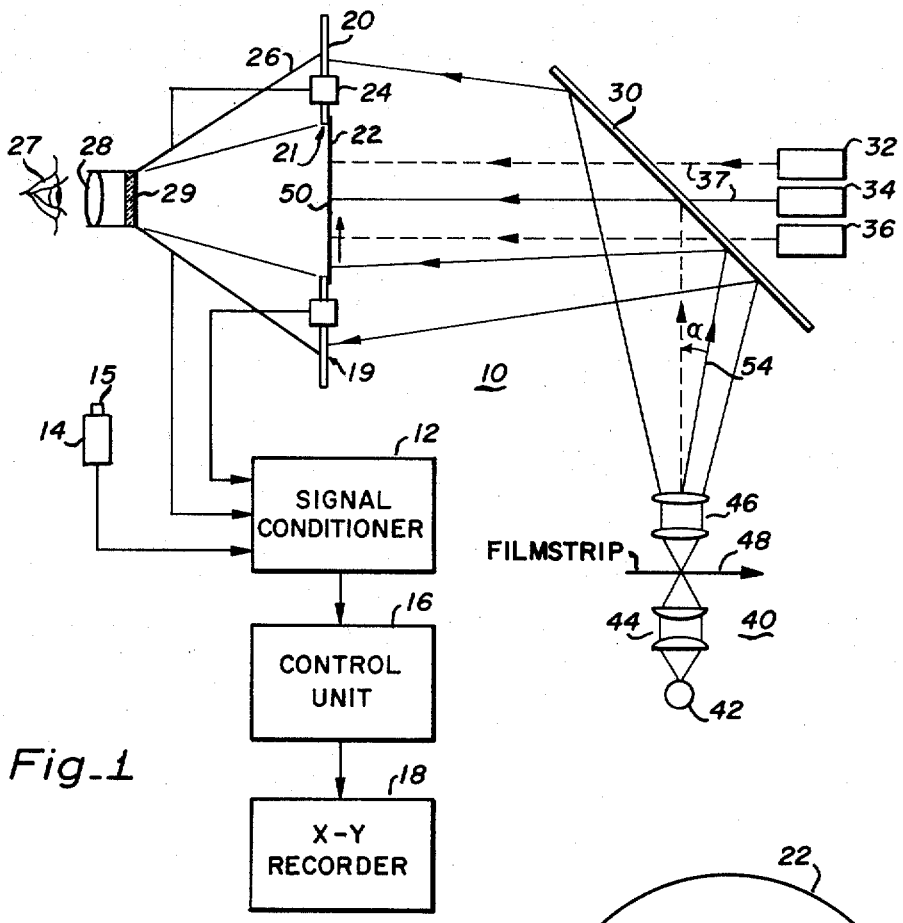
FIG. 1 is a schematic diagram illustrating the basic operative functions of a preferred embodiment of the present invention.

Referring now to FIG. 1 of the drawings which is a schematic illustration (from the top) of a visual sensitivity tester in accordance with the present invention, it will be noted that the apparatus includes a projection system 10 having a suitable housing (not shown), a signal conditioning unit 12 jointly responsive to stimulus signals generated by projection system 10 and response signals input by a patient via the response switch 14, a control unit 16, and a multiple pen X-Y recorder 18.

Projection system 10 is comprised of a vertically mounted panel 20 having a circular aperture 21 in its midportion to which a semi-transparent, semi-diffuse display screen 22 is affixed. In addition, a pair of photocells 24 are disposed in each of the upper and lower corners of panel 20 outside the bounds of screen 22. Affixed to the front side of panel 20 is a shroud 26 for shielding that side of screen 22 from external light. Shroud 26 also serves as a support for a viewing lens 28 and filter unit 29 through which an eye 27 under test views screen 22. A mirror 30 and three visual fixation cross projectors 32, 34, and 36 are disposed opposite the rear side of panel 20. The fixation projectors may either be positioned above and behind mirror 30, as indicated, or may be suitably positioned on the front side of mirror 30 with their light beams being reflected by mirror 30 onto screen 22. A motion picture projector 40 including a light source 42, condensing lens 44 and projection lens 46 is also provided for projecting images from a movie filmstrip 48 onto the rear side of panel 20 via reflection from mirror 30.

In accordance with the present invention, the image projected from filmstrip 48 includes a stimulus image, in the form of a moving white spot of light, and a plurality of small coded spots of light disposed at fixed positions outside of the field falling on screen 22. The moving white spot is caused to sequentially move in a predetermined manner over 12 meridians lying within that portion of the image which is projected onto screen 22, while the coded spots of light are projected outside of screen 22 to fall on the photocells 24. The coded light spots cause photocells 24 to generate binary coded decimal signals corresponding to the stimulus image's meridian location, direction along each meridian, and on-off status.

Figure 2:
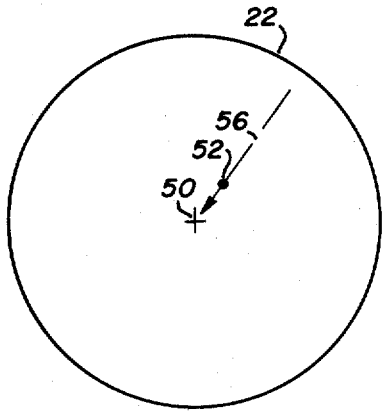
FIG. 2 is a diagram further illustrating the stimulus display screen of FIG. 1.

In operation, the patient is instructed to fix his gaze upon a fixation cross at, for example, the point 50 (as projected by projector 34) on screen 22, and is further told to press button 15 of response switch 14 during the times that he does not see a white dot moving across screen 22, and to release button 15 during times that he is able to see the moving white dot. As depicted in FIG. 2, the moving white dot 52 is projected onto screen 22 by projector 40 and is caused to move first along one meridian and then another toward, or away from, fixation cross 50. During the time that the spot generating beam 54 (FIG. 1) is swung over the angle $\alpha$ (causing spot 52 to sweep over a single meridian), it will be caused to momentarily disappear during random portions of its sweep traverse. As spot 52 is swept slowly over each of the 12 meridians, spot presence and location data in the form of binary pulses are generated by photocells 24, and this data is input to signal conditioner 12. Switch 14 supplies the patient response input signals to signal conditioner 12. The conditioned signals developed by conditioner 12 are then fed into control unit 16 which in turn develops appropriate control signals for energizing the ink pens of recorder 18 so that both the white spot path and the response thereto are recorded for evaluation.

As an alternative to the motion picture projecting embodiment of FIG. 1, it will be appreciated that a cathode ray tube 60 can likewise be used to generate similar dynamic test images similar to those projected in the previous embodiment. In this embodiment, a program source 62, such as a digital computer, a video tape player, a punched paper tape player, or some other suitable source of stimulus signals, is provided for converting a prerecorded test program into input signals suitable for driving the CRT control electronics 64 which, in turn, cause CRT 60 to develop the desired test display. The program source 62 functions to replace the conditoned photocell signals from signal conditioner 12. The vertical (Y) and horizontal (X) inputs of the CRT control electronics 64 are connected in parallel with the X-Y recorder inputs. This results in the simultaneous X-Y control of the CRT dot and the pens of the X-Y recorder. The CRT dot and pens move in synchronism to provide the test image and record the results, respectively.

In FIG. 4 of the drawings, there is shown a more detailed preferred embodiment of an automated visual sensitivity tester in accordance with the present invention which includes a rear projection, cartridge loaded, super 8mm movie projection unit 110, a control unit 112, and a response plotter 114. Projection unit 110 includes a display panel 116 having a transparent, semi-diffuse projection screen 118 and eight photocells 120 mounted two in each corner as schematically illustrated in FIG. 1. Beneath display panel 116 and to the right side of the instrument cabinet 121, a film cartridge insertion slot 122 is located for receiving a film cartridge or cassette 124.

At the front of the cabinet beneath slot 122, a slanted control panel 126 is provided which includes an ON lever 128 for turning the projector ON, an OFF button 130 for turning the projector OFF, a visual fixation projector control toggle 132 which allows the visual fixation projectors to be turned ON independently of the projector, a visual fixation cross selector knob 134 which is a three-positioned switch for individually turning on each of three visual fixation projectors, a cable plug 136 for connecting the hand-held response switch 138 to the apparatus, an image focus knob 140, and a movie projector framing control knob 142 for adjusting the stimulus' vertical screen position. Directly beneath control panel 126 four shelves 144 are provided for storing extra film cartridges.

An aluminum mask, or shroud 146 is mounted over display panel 116 on the patient's side of screen 118. Although shroud 146 extends outside the locus of photocells 24, the viewing lens 28 limits the field of view to a 60° arc-diameter including screen 118. The eight photocells 120, which may for example, be of the Clairex type CL-905-L are located outside of this field of view on the patient's side of panel 116. Mounted rigidly to the front of shroud 146 is a viewing lens and filter mount 148 through which the patient 150 views screen 118. In order to insure that the patient's head is properly centered behind the viewing aperture (lens) 152, an adjustable dental impression bite board 154 and adjustable forehead rest 156 are provided. However, as an alternative, a chin rest and a curved padded support at the temples could also be used.

Within cabinet 121 are included film projecting components such as the lamp 160, condensing lens (not shown), projecting lens 162, a small-sized reflector 164, a medium-sized reflector 166, a large-sized reflector 168, and suitable film drive apparatus (not shown). Note that when cassette 124 is included in the projector, the small reflector 164 is positioned behind film 170 for reflecting the light passing through film 170 up to projection lens 162. The projector is capable of projecting images from both color and black-and-white movie filmstrips onto screen 118. Since the film 170 contained within cassette 124 is a continuous loop, no threading is required and the film be stopped and the cartridge removed from the tester at any time. Three visual fixation cross projectors 172 are also provided within cabinet 121 and are mounted in such a position that they will project into mirror 168. Projectors 172 project red crosses of 10 minute-arc bar length upon viewing screen 118, at its middle and about 15° arc to the left and right of the middle cross, respectively. The projectors 172 may, for example, include a 6.3 volt lamp, opal glass diffuser, photographic negative of a cross, focusable achromatic lens, and a red No. 24 Wratten filter. Lamp luminance is controlled by adjustable resistors (not shown).

Projection unit 110 also includes signal conditioning circuitry (not shown) which converts the output of photocells 120 into binary signals including: four binary coded bits denoting one of 12 preset stimulus meridians; two binary coded bits denoting stimulus direction of travel (IN or OUT along a given meridian) and a HOLD or RESET command; one binary coded bit denoting stimulus condition (light ON or OFF); and a sync bit which indicates whether the lamp 160 is ON or OFF. In addition to the photocell input, the patient's response signals are also input to the signal conditioning circuitry.

The conditioned signals are then fed into the programming circuitry 180 of control unit 112 which includes a relay interface 182, a decode matrix 184, and a number of reed relays 186. Relay interface 182 develops a stimulus signal on line 188, a patient response signal on line 190, and binary coded control information which is coupled into the decode matrix 184 on line 192. The decode matrix unit 184 develops OUT, IN, HOLD, and RESET signals on the lines 194, 196, 198, and 200, respectively, as well as actuating signals for the reed relays 186. Lines 194 and 196 out of decode matrix 184 are coupled into the OUT and IN terminals, respectively, of a voltage regulator 202 of the output circuitry 204 which, in addition, includes an integrator 206, buffer amplifiers 208 and 210, and an X-Y coordinate selection unit 212. The HOLD and RESET signals on lines 198 and 200, respectively, are coupled into integrator 206 and the decoded stimulus information is used to drive relays 186 which perform a channel selection function for X-Y coordinate selection unit 212. Unit 212 develops an X-axis output on line 214 and a Y-axis output on line 216 which respectively energize the X and Y-axis drive units of plotter 114.

More specifically, the binary coded stimulus information is decoded by matrix 184 and used to drive reed relays 186 to control an analog voltage for input to unit 212. The stimulus direction of travel (IN or OUT) signals allow a plus or minus regulated voltage from regulator 202 to drive the output of integrator 206 toward a first voltage (+5 volts) or back to a second voltage (0 volts). If the first command is OUT, the output of integrator 206 will initially move toward +5 volts. This command will then be followed by a HOLD command and then by an IN command. The ramp output voltage will then move toward 0 volts. If the sequence is reversed (an IN command followed by a HOLD, followed by an OUT command), the output of integrator 206 will move from 0 volts toward −5 volts followed by a HOLD condition then back toward 0 volts. The results of using both of these sequences is to provide 24 unique radial pen excursions, along the 12 preprogrammed meridians.

The "ramp" output voltage developed by integrator 206 on line 207 is buffered by the two amplifiers 208 and 210 to develop plus and minus ramp voltages on lines 209 and 211. The plus and minus ramp voltages are fed into X-Y coordinate selector 212 which, as better illustrated in FIG. 4a, includes two potentiometers 213 per meridian that are used to preset each of the X and Y coordinates of pen travel. Toggle switches 215 are used to select the sign of the sine or cosine functions for locating the meridian within any of the four projection screen 118 quadrants. For example, if the pens of response plotter 114 are supposed to move along the 30° meridian (all meridians are measured from the 12 o'clock position in the clockwise direction) the X-channel potentiometer is set for +0.866 and the Y potentiometer for +0.500. These values represent the cosine and sine of 30°, respectively. An OUT command will then cause the pens to move out from the center of the data recording sheet along the 30° meridian. If, however, an IN command is initiated first, the pen will travel along a 210° meridian (i.e., 180° from the 30° meridian). Although the response plotter's pens are driven in parallel, the patient's response switch 138 and the stimulus OFF/ON information cause the pens to drop onto the paper independently.

In operation, an eye positioning plate (not shown) is inserted into a slot just behind the viewing lens 152, and the visual fixation cross selector knob 134 is turned to the top left position, if the blind spot of the right eye is to be tested; to the middle position, if the visual sensitivity of either eye is to be tested; and to the top right position, if the blind spot of the left eye is to be tested. The patient is then instructed to bite onto bite board 154 (or place his chin into a chin rest) and to loosen the horizontal and vertical adjustment knobs 155. He then slides bite board 154 horizontally and vertically until the fixation cross is seen through a small hole in the eye positioning plate, whereupon he tightens the adjustment knobs 155 finger tight and then adjusts the forehead rest 156. The eye positioning plate is then removed, and the test film is turned on to begin the test.

The patient is then told to hold the response switch 138 in his preferred hand, resting his thumb on the button, and to maintain his gaze directly upon the red cross and note the small white spot of light which will travel slowly across the field of view in various directions, and which will, from time to time, disappear. It is also pointed out that to make these visual tests valid, it is important that visual fixation (i.e., direction of gaze) be maintained on the small fixation cross projector on the screen throughout the test. The patient is to merely press his finger button as soon as the white light disappears and to release the finger button the instant the white light reappears.

In accordance with one visual sensitivity testing scheme, the spot traverses radially outwardly or inwardly from the screen center point to make interrupted traces such as those illustrated in FIG. 2 (see also FIGS. 5 and 7). The outer portions of the program film 170 simultaneously project the coded light spots onto the several photocells 120 which generate signals that, when fed into control unit 112, actuate the stimulus recording pen of plotter 114. If the patient sees the spot disappear and properly depresses the button of switch 138, patient's response signals will also be generated for actuating the second pen of plotter 114 so as to inscribe a parallel mark (shown dashed in FIGS. 5 and 7) next to the stimulus marks. However, when the patient sees the spot reappear on screen 118, he will, of course, release the control button. The correspondence between the two parallel marks on the plot will indicate his visual deficiency.

The visual sensitivity of a patient having a glaucomatous dysfunction is illustrated in FIG. 7 of the drawings which indicates a large scotoma in the upper right-hand visual field along the 30°, 60°, and 90° meridians from the foveal boundary out to a 30° arc radius limit. This may be compared with the test results of a patient having normal visual sensitivity and reaction times to the disappearance and reappearance of the moving white spot of light as shown in FIG. 5.

In administering the blind spot mapping test (see FIGS. 6 and 8), the patient is told to position his head as before, to fix his gaze upon the small cross on the screen, and to press the finger button whenever the moving white spot disappears and release the finger button when the spot reappears. In this case, however, the moving white spot of light is never turned off as it traverses the patient's field of view. It disappears only when its image falls upon the blind spot or other areas of retinal insensitivity. By using one of the visual fixation crosses located to one side of the center of the viewing screen and by causing the moving white spot to traverse along each of the 12 meridians centered upon the viewing screen (where the blind spot is also imaged), the image of the white spot of light will traverse the blind spot's boundary. This produces a polar coordinate graphic plot of the boundary of his blind spot. Because the white spot of light moves both OUT and IN along each meridian (thereby plotting the blind spot boundary from each direction in 12 locations), an experimenter makes a small vertical mark when the response plotter's pen indicates that the patient has pressed his response button for the IN direction of travel. The actual blind spot boundary is taken as the average of the OUT and the IN pen marks. In FIG. 6, test results for a normal right eye are illustrated, while in FIG. 8 the results are shown for an individual (the same patient as in FIG. 7) having a glaucomatous dysfunction.

Since the recorded data provided by the present invention is in the form of stimulus traces and associated response traces, it will be appreciated that the test results need not necessarily be recorded in polar coordinate form, but could likewise be recorded in strip chart form, or the like, where a switch means of reference is provided. For example, if in the case of visual sensitivity examination, the pen traces are made by fixed position pens which record on a moving strip of paper and some type of marker is provided to indicate which traces are included in each stimuli meridian and their respective radial positions in a given meridian or other portion of a focal field, the data would be just as interpretable as in the illustrated polar type of graph.

From these examples, the utility of the present invention will be readily appreciated by those skilled in the art and certain modifications and improvements thereof will no doubt become apparent. It is therefore to be understood that the above disclosure is by way of illustration only and is not intended to be limiting. Accordingly, the appended claims are intended to cover all such modifications and improvements as fall within the true spirit and scope of the invention.

What is claimed is:

1. Visual examination apparatus, comprising:

light receiving means including, a display screen for displaying visual stimuli to a patient, and photosensitive means [ responsive to light and operative to generate binary coded decimal signals which control the meridian ] *positioned to receive coded images for generating binary coded decimal signals as a function of said coded images representative of the meridian* location, [ and ] *direction of* [ the stimulous image ] *movement and on-off status of the stimulus images;* light projecting means for projecting stimulus images onto said signal display screen, and for projecting [ control ] *said coded* images commensurate with said stimulus images onto said photosensitive means;

*said stimulus projecting means including means for sequentially projecting onto said display screen a continuously moving light image as an interrupted random trace in a pre-determined direction along a pre-determined meridian, said direction and meridian being automatically selected by means of a preset vision testing program and without active interaction with the patient being tested;*

[ said light projecting means including means for projecting light through a flimstrip containing said stimulus images and said control images and onto said light receiving means; ]

patient response means for developing response signals commensurate with said visual stimuli as perceived by said patient;

means responsive to said [ stimuli signals ] *binary coded decimal signals* and said response signals and operative to develop recorder control signals; and a recorder responsive to said recorder control signals and operative to provide a comparable record of said visual stimuli and the patient response corresponding thereto.

2. Visual examination apparatus as recited in claim 1 and further comprising means for projecting [ one or more ] *at least one* fixed position fixation [ images ] *image* onto said display screen.

3. Visual examination apparatus as recited in claim 1 wherein said means responsive to said signals includes electronic control circuitry responsive to said [ stimuli ] *binary coded decimal* signals and said response signals and operative to develop a first set of said recorder control signals, said control circuitry being further responsive to said [ stimuli ] *binary coded decimal* signals to develop a second set of said recorder control signals.

4. Visual examination apparatus as recited in claim 3 wherein said recorder includes a pair of trace developing means responsive to said first set of control signals, and positioning means responsive to said second set of control signals and operative to position said trace developing means.

5. Visual examination apparatus as recited in claim [ 1 ] 6 wherein [ said light projecting means ] *said means for displaying* includes a cathode ray tube and programmable means for driving said cathode ray tube in accordance with a test program.

*6. Visual examination apparatus, comprising:*

*means for displaying visual stimuli on a display screen to a patient;*

*said means for displaying visual stimuli including means for sequentially projecting onto said display screen a continuously moving interrupted random trace of a light image in a pre-determined direction along a pre-determined meridian, and means for automatically selecting the direction and meridian without interaction with the subject, said means including an already prepared vision testing program;*

*means for simultaneously generating electrical stimuli signals representative of the meridian location and direction of stimulus images;*

*patient response means for developing response signals commensurate with said visual stimuli as perceived by said patient;*

*means comprising electronic control circuitry responsive to said stimuli signals and said response signals and operative to develop concurrent recorder control signals therefor, and*

*a recorder responsive to said recorder signals including independent dual trace producing means and operative to provide a comparable record of said visual stimuli and the patient response corresponding thereto.*

*7. Visual examination apparatus as recited in claim 6 wherein said means for displaying includes:*

*a filmstrip containing stimulus images and coded images, a display screen, and a projector for projecting said stimulus images onto said display screen and said coded images onto said means for generating electrical stimuli signals.*

*8. Visual examination apparatus as recited in claim 6 wherein said means for displaying includes:*

*light receiving means including a display screen for displaying visual stimuli to a patient, and photosensitive means for generating binary coded decimal signals representative of the meridian location and direction of stimulus images; and*

*light projecting means for projecting stimulus images onto said display screen, and for projecting coded images commensurate with said stimulus images onto said photosensitive means.*

*9. Visual examination apparatus as recited in claim 7 wherein said electronic control means is operative to develop first and second sets of recorder control signals and said dual trace producing means is actuated in response to said first set of control signals and positioned in response to said second set of controls signals.*

*10. Visual examination apparatus as recited in claim 5 wherein said electronic control means is operative to develop first and second sets of recorder control signals and said dual trace producing means is actuated in response to said first set of control signals and positioned in response to said second set of controls signals.*

*11. Visual examination apparatus as in claim 8 wherein said*

*light projecting means includes a filmstrip containing stimulus images and control images.*

*12. Visual examination apparatus as recited in claim 6 and further comprising at least one visual fixation cross projector.*

*13. A visual examination apparatus as recited in claim 5 wherein said programmable means includes a digital computer.*

*14. A visual examination apparatus as recited in claim 5 wherein said programmable means includes a video tape player.*

*15. A visual examination apparatus as recited in claim 5 wherein said programmable means includes a punched paper tape player.*

*16. Visual examination apparatus as recited in claim 8 wherein said response means includes switch button means to be depressed by the patient when the stimulus image is not observed on the display screen and released when it is observed on the said screen.*

* * * * *